Dec. 7, 1965  M. SCHWARTZ  3,222,117
STORAGE RACK

Filed March 8, 1963  2 Sheets-Sheet 1

INVENTOR.
MILTON SCHWARTZ
BY Arthur Freilich
ATTORNEY

Dec. 7, 1965  M. SCHWARTZ  3,222,117
STORAGE RACK
Filed March 8, 1963  2 Sheets-Sheet 2
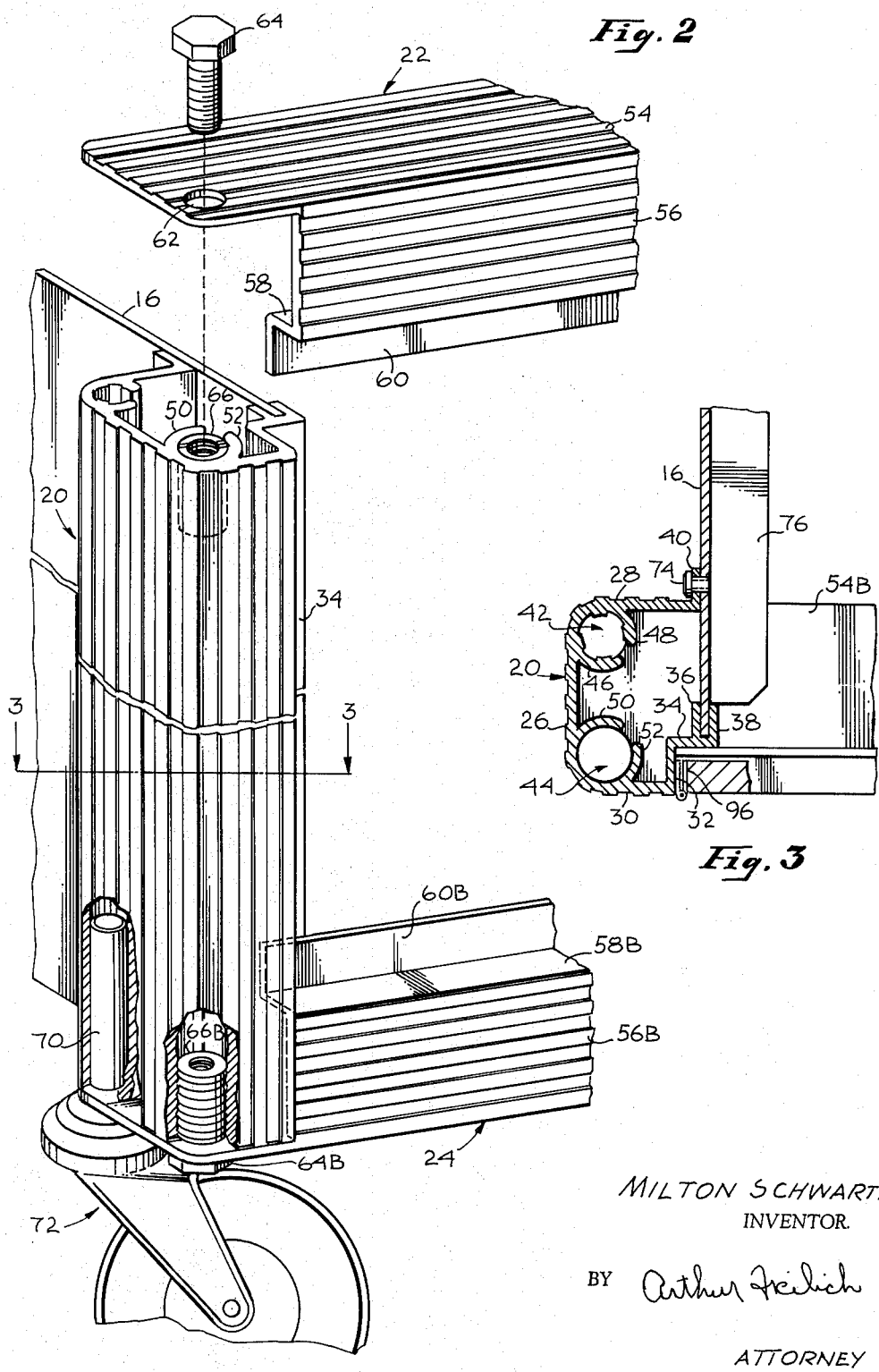
MILTON SCHWARTZ
INVENTOR.
BY Arthur Freilich
ATTORNEY

United States Patent Office 3,222,117
Patented Dec. 7, 1965

3,222,117
STORAGE RACK
Milton Schwartz, Syosset, N.Y., assignor to Advance Food Service Equipment, Inc., Westbury, N.Y., a corporation of New York
Filed Mar. 8, 1963, Ser. No. 263,844
2 Claims. (Cl. 312—264)

This invention relates generally to storage racks and more particularly to racks for storing pans of the type utilized in the baking industry.

Commercial bakers utilize large flat pans for holding baked goods. Prior and subsequent to baking, the loaded pans are generally stored in mobile storage racks so that a plurality of pans can be easily moved together from one location to another. These racks are useful, for example, in moving the loaded pans onto waiting trucks for distribution to retail outlets.

For many years, these racks have been constructed of a plurality of angle irons welded together to form a three dimensional rectangular frame. Additional angle irons are mounted horizontally by welding them to the sides of the frames. The horizontal angle irons constitute shelves on which the pans can be supported. A number of casters are usually secured to the bottom portion of the frames to permit the racks to be easily moved.

Recently, health departments in several cities have directed that the storage racks be enclosed as, for example, by welding side walls adjacent the horizontally disposed angle irons and by providing the storage rack with doors.

Because of these new health department regulations and because of increasing shipping and warehousing expenses, the cost of storage racks fabricated by conventional techniques has risen in a disproportionate relationship with respect to other similar types of goods. Additionally, rising labor expenses have contributed to the ultimate cost of storage racks inasmuch as a considerable amount of welding has been required in their assembly. The significance of the labor expense involved has necessitated that manufacturers provide special jigs to facilitate the proper positioning of the various angle members for the welder to enable him to complete the plurality of welds in a minimum time. However, the consequent reduction in labor expense has been somewhat offset by the expense involved in providing the jigs.

Recent innovations in storage racks have included the provision of racks which could be folded when not in use. Although such racks are considerably less expensive to transport and warehouse, since these costs are based on both volume and weight considerations, it has been found that such racks lack sufficient structural rigidity for extended use.

In the light of the excessively high cost of known storage racks, it is an object of this invention to provide a storage rack which can be assembled, shipped, and stored at lower costs than have heretofore been possible.

It is an additional object of this invention to provide a storage rack having a plurality of component parts which can be shipped individually and which can be easily assembled, without requiring the use of jigs or excessive welding, at its destination.

It is still an additional object of this invention to provide a storage rack which can be provided at a lower cost than heretofore available storage racks and whose significant characteristics such as rigidity, mobility, etc., are substantially equivalent to the characteristics of storage racks which are considerably more expensive.

Briefly, the invention comprises a storage rack including front and rear rectangular frames each of which includes a pair of spaced parallel channel members connected by spaced parallel top and bottom cross members. The frames are so positioned with respect to each other that the channels defined in the channel members of each frame are respectively opposed to the channels defined in the channel members of the other frame. Consequently, sidewalls which are provided can be slidably received in the opposed channels so as to thereby extend between and connect the front and rear frames. The sidewalls received in each pair of opposed channels is provided with shelves projecting perpendicularly therefrom and toward the sidewall received in the other pair of opposed channels. The shelves, of course, are adapted to support bakers pans and the like. By so providing the shelves on sidewalls which can be slidably received in the channels, the requirement of utilizing jigs to horizontally position angle irons prior to welding is avoided.

A feature of the invention constitutes the provision of a sidewall, adapted to be received between opposed channels, which consists of a plurality of sidewall sections, each section being formed with a plurality of shelves thereon. The top or bottom portion of each section is indented to permit each section to partially overlap a section immediately above or below it to thereby impart substantial rigidity to the entire storage rack structure when assembled.

The invention is further characterized by its ability to be easily assembled on site without requiring substantial welding. An exemplary structural arrangement incorporating this ability makes use of channel members which have a receptatcle formed therein adapted to snugly receive an internally threaded bushing which in turn is adapted to receive a bolt for securing frame cross members to the channel members. By providing a storage rack which can be assembled on site the cost to the ultimate user is considerably reduced from what it would be if the rack was constructed in accordance with conventional techniques.

A significant feature of the preferred embodiment of the invention shown herein resides in the provision of uniquely shaped channel members which in addition to defining channels adapted to slidably receive sidewalls, are provided with surfaces spaced from the channels adapted to engage received sidewalls for increasing the rigidity thereof. In addition, each channel member includes a pair of receptacles for respectively receiving a shank of a caster wheel assembly and a threaded bushing which is utilized to assemble the storage rack. Further, all of the frame members are provided with surfaces adapted to collectively serve as a door jamb. In order to further minimize the cost of the storage rack, all significant component parts, that is the frame members and sidewalls, are designed in a manner such that they can be formed by an extrusion process.

A still further feature of the invention resides in the provision of a universal adapter, designed to be secured to the shelves, which includes shelf extensions to thereby permit the spacing between opposed shelves to be reduced to allow smaller than standard pans to be supported. In a preferred embodiment of the invention, the terminal portion on each shelf is formed to depend perpendicularly from the main shelf portion to enable a universal adapter to be slidably received and retained thereon.

Other objects, features, and advantages which will become subsequently apparent reside in the details of construction as more fully hereinafter described and claimed, further reference now being made to the accompanying drawings forming a part hereof, wherein like numerals refer to like parts throughout and in which:

FIGURE 2 is a perspective partially broken away and partially disassembled view of a portion of one of the rectangular frames;

FIGURE 3 is a horizontal sectional view taken substantially along the line 3—3 of FIGURE 2 illustrating in detail the unique shape of a channel member.

Figure 1:
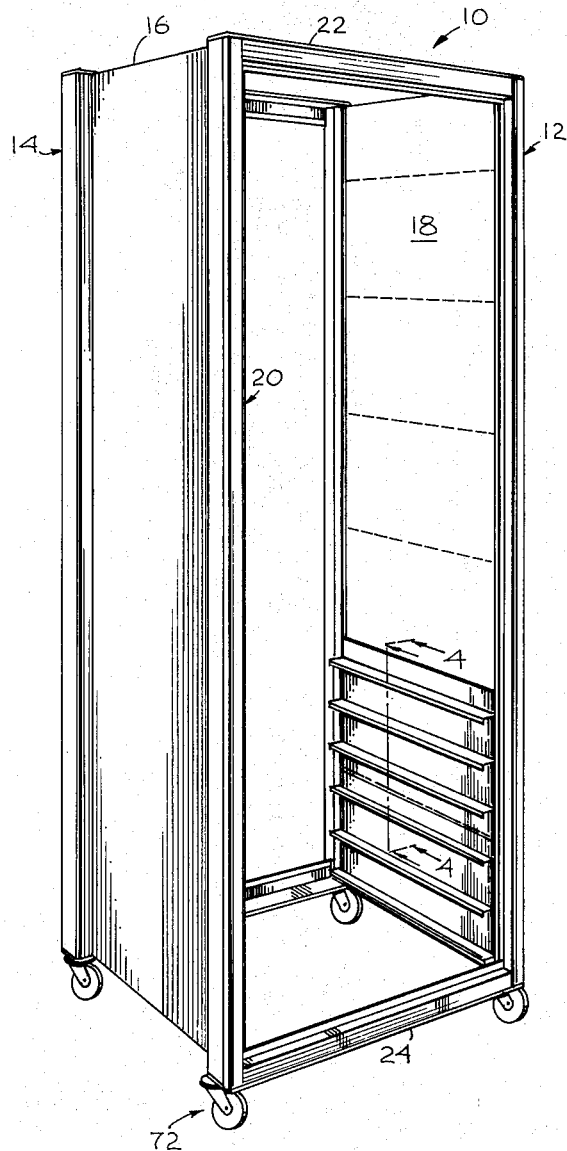
FIGURE 1 is a perspective view of a storage rack constructed in accordance with the invention.

With continuing reference to the drawings, initial attention is called to FIGURE 1 wherein a perspective view of an assembled storage rack 10 is illustrated. The storage rack 10 consists of a front rectangular frame 12 and a rear rectangular frame 14. The front and rear frames 12 and 14 are interconnected by a side wall 16 which is secured to each. The sidewall 16 may be of unitary construction or may be formed of a plurality of sidewall sections 18.

Attention is now called to FIGURES 2 and 3 wherein the structural details of the storage rack 10 are more easily discernible. Each of the frames 12 and 14 consists of a pair of spaced parallel vertically extending channel members 20 which are interconnected by spaced parallel horizontally extending top and bottom cross members 22 and 24.

The channel members 20 are substantially U-shaped in cross section and include a base portion 26 and a pair of arms 28 and 30 extending substantially perpendicularly therefrom. The arm 30 terminates in a wall 32 extending perpendicularly therefrom toward the arm 28. Wall 32 terminates in a wall 34 extending perpendicularly therefrom and parallel to the arms 28 and 30. A pair of spaced walls 36 and 38 are formed on the wall 34 and define a channel therebetween. Arm 28 terminates in a wall 40 which is formed perpendicularly to the arm 28 and projects away from the arm 30.

A first cylindrical receptacle 42 is formed at the junction of base 26 and arm 28 while a second cylindrical receptacle 44 is formed at the junction of base 26 and arm 30. The receptacle 42 is defined between arcuately extending arms 46 and 48 which respectively project from the base 26 and arm 28. The receptacle 44 is defined between the arcuately extending arms 50 and 52 which respectively extend from the base 26 and arm 30.

The top cross member 22 consists of a horizontal flat member 54, a flat perpendicularly and terminally depending wall 56, a flat horizontally projecting wall 58, and a vertically depending wall section 60. It is pointed out that the walls 56, 58, 60 terminate in a common plane while the flat member 54 projects therebeyond. An aperture 62 is defined in the projecting portion of the member 54 and is adapted to receive therethrough a bolt 64 which in turn is adapted to threadedly engage the internal threads formed in bushing 66 which is force fitted into the upper portion of the receptacle 44 defined between arms 50 and 52.

When the top cross member 22 is secured to the channel member 20 by bolt 64, the extension of the flat surface 54 of the cross member 22 rests on the horizontal upper portion of channel member 20 while the depending wall 60 of cross member 22 engages the wall 34 of channel member 20.

Bottom cross member 24 is constructed similarly to top cross member 22. More particularly, bottom cross member 24 includes a vertically extending wall 60b, a horizontally extending wall 58b, a vertically extending wall 56b, and a horizontally extending flat member 54b. The member 54b projects beyond the plane in which the other portions of the bottom cross member 24 terminate. The projecting portion of surface 54b defines a pair of apertures adapted to respectively receive therethrough a bolt 64b and a shank 70 of a caster wheel assembly 72. The bolt 64b is adapted to be threaded into a threaded bushing 66b which in turn is force fitted into the bottom portion of receptacle 44. The shank 70 of the caster wheel assembly 72 projects into the receptacle 42 defined between the arcuately extending arms 46 and 48.

In order to assemble the storage rack, a pair of channel members 20 are affixed to the ends of a bottom member 24 in the manner shown in FIGURE 2. Thereafter, a sidewall 16 is slidably received in channels defined between walls 36 and 38 of opposing channel members. It should be realized that both the front and rear frames 12 and 14 include a pair of channel members. The channel members of the front frame 12 define channels which are each respectively opposed to channels defined in the channel members of the rear frame 14. A sidewall is slidably received in each pair of opposed channels. By securing the sidewalls to the channel members as by the utilization of self tapping screws 74 which can be passed through the wall 40 and into the sidewall 16 or by spot welding, the front and rear frames can be fixedly secured with respect to one another.

It is to be noted that the sidewalls 16 rest on the members 54b of bottom cross members 24. In addition, it is to be noted that each sidewall 16 projects into opposed channels defined between the walls 36 and 38 of opposed channel members and in addition are rigidified by the wall 40 which engages the sidewall 16 at a point spaced from the engagement of the sidewall 16 with the walls 36 and 38.

Each of the sidewalls 16 has a plurality of spaced shelves 76 extending perpendicularly therefrom. When the sidewall 16 is received between a pair of channel members, the shelves project toward the opposite sidewall received between the other channel members.

In order to further rigidify the resulting storage rack and to further minimize shipping costs, each sidewall 16 can be formed of a plurality of sidewall sections adapted to be slidably received in the channels between the channel members one on top of the other.

Figure 4:
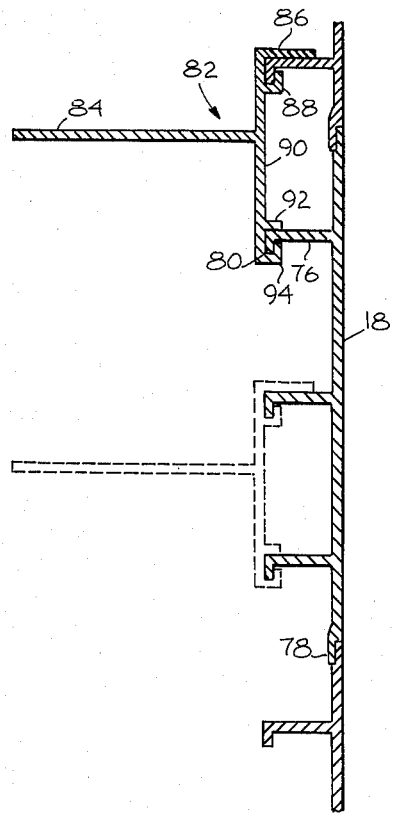
FIGURE 4 is a vertical sectional view taken substantially along the line 4—4 of FIGURE 1 showing in detail a sidewall section and the manner in which a universal adapter can be used therewith.

Attention is now called to FIGURE 4 wherein the detailed construction of sidewall sections 18 is illustrated. Each of the sidewall sections 18 is provided with an offset or indented portion 78 adapted to overlap an oppositely indented or offset portion of a sidewall immediately below or above it between the same channel members. By overlapping the top and bottom portions of each sidewall section 18, significant rigidity is imparted to the sidewall and overall storage rack construction along spaced horizontal lines between the channel members 20.

Projecting perpendicularly from the sidewall sections 18 are shelves 76 which in conjunction with oppositely projecting shelves on opposing sidewall sections are adapted to support bakers pans and the like. Because many users of bakers pans such as schools, restaurants, and institutions, utilize pans which are not of a standard size, it is desirable to provide a universal adapter which permits pans smaller than conventional pans to be supported. For this purpose, each of the shelves 76 is provided with a depending terminal portion 80. A universal adapter 82 including a shelf extension 84 is adapted to be slidably received and retained on the shelves 76. Each of the adapters 82 is provided with a flat piece 86 designed to engage the top surface of a shelf 76. Spaced from the flat piece 86 is a right angle piece 88 designed to slidably receive depending shelf portion 80 between itself and an adapter base plate 90. Similarly, the adapter 82 is provided with a second flat piece 92 placed above and spaced from a second right angle piece 94. The piece 92 is designed to rest on the top surface of a shelf 76 while the depending shelf portion 80 is received between the right angle member 94 and the adapted base plate 90.

From the foregoing, it should be apparent that applicant has herein provided a mobile storage rack for supporting bakers pans and the like which can be easily assembled on site and which possesses sufficient rigidity and stability to satisfactorily function for its intended purpose. It is pointed out that regardless of whether the sidewalls 16 or sidewall sections 18 are utilized, the bakers pans supported on the shelves 76 or shelf extensions 84 will be partially enclosed thereby preventing dirt, which could otherwise enter between the opposed channel members, from falling into the supported pans. In order to further protect baked goods on the pans, it is often desirable to provide doors in each frame. For this purpose, a piano hinge 96 can be secured to wall 32 of one of the channel members 20 in each of the frames 12 and 14. Walls 60 and 60b of the cross members and wall 34 of the frame channel member to which the hinge is not secured can then collectively serve as a door jamb.

It should further be appreciated that applicant has, in addition to providing a storage rack which can be easily assembled on site, provided a rack which can be completely formed of extruded members of material such as aluminum. Since the component members of the rack can be extruded, and since the rack can be shipped and stored in a disassembled state thereby occupying considerably less volume than would normally be required, a considerable cost saving accrues to the manufacturer and user.

Although a preferred manner of assembling the component parts of the storage rack has been disclosed, it should be understood that any of several different means could be utilized to secure the component members of the frames to each other. However, regardless of the means utilized to affect this securing, the provisions of the channels in the members 20 for receiving the sidewalls having the shelves formed thereon represents a significant improvement over prior art devices since such a construction automatically properly positions the shelves and partially encloses the volume within which the pans are adapted to be supported.

The foregoing is therefore considered as illustrative only of the principles of the invention. Since numerous modifications and changes will readily occur to those skilled in the art, it is not desired to limit the invention to the exact construction shown and described, and accordingly all suitable modifications and equivalents may be resorted to, falling within the scope of the invention as claimed.

The following is claimed as new:

1. A rack assembly for storing bakers pans and the like comprising:

front and rear rectangular frames each including a pair of spaced parallel elongated members connected by a pair of spaced parallel cross members;

each of said elongated members defining a channel therein;

said frames being oriented in spaced parallel relationship with the channels defined in the members of said front frame being opposed to and opening toward the channels defined in the members of said rear frame and;

first and second sidewalls each respectively extending between and into opposed channels of the members of said front and rear frames;

means securing each of said side walls to the members between which it extends;

each of said side walls having spaced parallel shelves extending substantially perpendicularly therefrom and directed toward the other sidewall;

each of said elongated members being provided with a pair of spaced elongated arcuate arms defining a cylindrical receptacle therebetween whose axis extends parallel to said elongated members.

2. The rack assembly of claim 1 wherein a threaded bushing is fitted into said receptacle and said cross members are each provided with apertures aligned with said receptacle and a bolt is threadedly engaged with said bushing for securing said cross members to said elongated members.

References Cited by the Examiner

UNITED STATES PATENTS

| | | | |
|---|---|---|---|
| 992,103 | 5/1911 | Atkinson | 217—12 |
| 1,146,415 | 7/1915 | Ekedahl | 312—140 X |
| 1,321,097 | 11/1919 | Gonzalez | 217—45 |
| 1,481,560 | 1/1924 | Ringer | 312—258 |
| 2,822,231 | 2/1958 | Golz et al. | 312—247 X |
| 2,936,899 | 5/1960 | Tashman | 211—134 |

FOREIGN PATENTS

| | | |
|---|---|---|
| 123,811 | 3/1947 | Australia. |
| 341,284 | 11/1959 | Switzerland. |

FRANK B. SHERRY, *Primary Examiner.*